US012105718B2

(12) United States Patent
Srinivasaraghavan

(10) Patent No.: US 12,105,718 B2
(45) Date of Patent: *Oct. 1, 2024

(54) SELF-ORGANIZING MAPS FOR ADAPTIVE INDIVIDUALIZED USER PREFERENCE DETERMINATION FOR RECOMMENDATION SYSTEMS

(71) Applicant: Verizon Patent and Licensing Inc., Basking Ridge, NJ (US)

(72) Inventor: Haripriya Srinivasaraghavan, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,727

(22) Filed: Jan. 3, 2022

(65) Prior Publication Data

US 2022/0147523 A1    May 12, 2022

Related U.S. Application Data

(63) Continuation of application No. 16/031,703, filed on Jul. 10, 2018, now Pat. No. 11,243,957.

(51) Int. Cl.
*G06F 16/2457*  (2019.01)
*G06F 16/9535*  (2019.01)
*G06Q 30/0601*  (2023.01)

(52) U.S. Cl.
CPC ...... *G06F 16/2457* (2019.01); *G06F 16/9535* (2019.01); *G06Q 30/0603* (2013.01); *G06Q 30/0631* (2013.01)

(58) Field of Classification Search
CPC ............ G06F 16/2457; G06F 16/9535; G06Q 30/0603; G06Q 30/0631
See application file for complete search history.

(56) References Cited

U.S. PATENT DOCUMENTS

| 6,134,532 A | 10/2000 | Lazarus et al. |
| 6,675,159 B1 | 1/2004 | Lin et al. |
| 7,577,520 B2 * | 8/2009 | Nomura ............ G01C 21/3896 |
| | | 701/453 |

(Continued)

OTHER PUBLICATIONS

Joshi et al., "Competition between SOM Clusters to Model User Authentication System in Computer Networks", IEEE (Year: 2007).*

(Continued)

*Primary Examiner* — Debbie M Le
*Assistant Examiner* — Huen Wong

(57) ABSTRACT

A computing device may include a memory configured to store instructions and a processor configured to execute the instructions to receive a selection of a content catalog item or a search query from a user; generate an input vector based on the selected content catalog item or the search query; and map the generated input vector onto one or more points on a self-organizing map associated with the user. The processor may be further configured to select a set of points within a particular distance of the one or more points; reverse map the selected set of points to a plurality of content catalog items using the self-organizing map associated with the user; and present one or more of the plurality of content catalog items to the user as recommended content catalog items for the user.

17 Claims, 11 Drawing Sheets

(56) References Cited

U.S. PATENT DOCUMENTS

| | | | |
|---|---|---|---|
| 9,602,573 | B1 | 3/2017 | Abu-Ghazaleh et al. |
| 11,330,009 | B2* | 5/2022 | Liu .................... G06F 16/2455 |
| 11,528,290 | B2* | 12/2022 | Liu .................... G06N 3/045 |
| 2002/0042793 | A1 | 4/2002 | Choi |
| 2003/0158828 | A1 | 8/2003 | Ikeda et al. |
| 2004/0107221 | A1 | 6/2004 | Trepess et al. |
| 2004/0254957 | A1 | 12/2004 | Hyotyniemi et al. |
| 2005/0143909 | A1 | 6/2005 | Orwant |
| 2005/0149467 | A1 | 7/2005 | Ono et al. |
| 2006/0009864 | A1 | 1/2006 | Kranner |
| 2006/0136402 | A1* | 6/2006 | Lee .................... G06F 16/2465 |
| 2006/0218138 | A1* | 9/2006 | Weare .................... G06F 16/38 707/999.005 |
| 2007/0011155 | A1 | 1/2007 | Sarkar |
| 2007/0198445 | A1* | 8/2007 | Zen .................... G06N 7/01 706/15 |
| 2008/0161652 | A1* | 7/2008 | Potts .................... G16H 50/20 600/300 |
| 2008/0288493 | A1 | 11/2008 | Yang et al. |
| 2009/0037355 | A1 | 2/2009 | Brave et al. |
| 2009/0063249 | A1 | 3/2009 | Tomlin et al. |
| 2009/0210246 | A1 | 8/2009 | Patel et al. |
| 2009/0248599 | A1 | 10/2009 | Hueter et al. |
| 2009/0259606 | A1* | 10/2009 | Seah .................... G06F 16/248 709/204 |
| 2010/0185579 | A1 | 7/2010 | Hong et al. |
| 2012/0254184 | A1* | 10/2012 | Choudhary .......... G06Q 50/01 707/738 |
| 2012/0317117 | A1* | 12/2012 | Akiyama ................ G06F 16/26 707/737 |
| 2013/0290339 | A1 | 10/2013 | Luvogt et al. |
| 2014/0101580 | A1 | 4/2014 | Shen et al. |
| 2014/0277910 | A1* | 9/2014 | Suh .................... B60C 23/0476 701/33.9 |
| 2014/0280251 | A1 | 9/2014 | Somekh et al. |
| 2015/0318696 | A1 | 11/2015 | Ochsenfeld |
| 2016/0021213 | A1 | 1/2016 | Ruan et al. |
| 2016/0188725 | A1* | 6/2016 | Wang .................. G06F 16/9535 707/734 |
| 2016/0357965 | A1* | 12/2016 | Prowell ................ G06F 21/566 |
| 2016/0373396 | A1 | 12/2016 | Sorg |
| 2017/0124200 | A1 | 5/2017 | Zhong et al. |
| 2017/0233051 | A1 | 8/2017 | Kawasaki et al. |
| 2018/0322206 | A1* | 11/2018 | Sun .................... G06F 16/9024 |
| 2019/0294522 | A1 | 9/2019 | Prasher |
| 2020/0027033 | A1 | 1/2020 | Garg et al. |
| 2021/0142352 | A1* | 5/2021 | Woodrick .......... G06Q 30/0224 |

OTHER PUBLICATIONS

Kohonen et al., "Self Organization of a Massive Document Collection", IEEE (Year: 2000).*

Ding et al., "User modeling for personalized Web search with self-organizing map", Journal of the American Society for Information Science and Technology (Year: 2007).*

Changchien et al., "Mining association rules procedure to support on-line recommendation by customers and products fragmentation", Elsevier Science (Year: 2001).*

Liao et al., "A self-organizing map for transactional data and the related categorical domain", Elsevier (Year: 2012).*

Kagie et al., "Map Based Visualization of Product Catalogs", Erasmus Research Institute of Management (Year: 2009).*

Ding, "User Modeling for Personalized Web Search With Self-Organizing Map", Journal of the American Society for Information Science and Technology (Year: 2007).*

Pushpa et al., "Web Page Recommendation System using Self Organizing Map Technique", International Journal of Current Engineering and Technology (Year: 2014).*

"Self-organizing map", Wikipedia article. Retrieved online https://en.wikipedia.org/wiki/Self-organizing_map on Jul. 17, 2018, 9 pages.

Bullinaria, "Self Organizing Maps: Fundamentals", Introduction to Neural Networks: Lecture 16, 2004, 15 pages.

Ding, et al., "Personalized Web search with self-organizing map", Nanyang Technological University (Year: 2005).

Gabrielsson, et al., "The use of Self-Organizing Maps in Recommender Systems", A Uppsala Master's Thesis in Computer Science 20p, submitted on Aug. 2006 to the Department of Information Technology at the Division of Computer Systems for the degree of Master of Science in Computer Science at Uppsala University.

Honkela, "Self-Organizing maps in natural Language Processing", Doctoral Thesis, Helsinki University of Technology. 1997, 64 pages.

Joshi, et al., "Competition between SOM Clusters to Model User Authentication System in Computer Networks", 2007 2nd International Conference on Communication Systems Software and Middleware, 2007, pp. 1-8, doi: 10.1109/COMSWA.2007.382421.

Kaski, "Data Exploration Using Self-Organizing Maps", Doctoral Thesis, Helsinki University of Technology. Ata Polytechnica Scandinavica: Mathematics, Computing and Management in Engineering Series No. 82. 1997, 57 pages.

Kohonen, "Self Organisation of a Massive Document Collection", IEEE Transactions on Neural Networks, vol. 11, No. 3, May 2000.

Sanchez, et al., "Clients Segmentation According to their Domestic Energy Consumption by the Use of Self-Organizing Maps", Feb. 2009, IEEE.

Sinthupinyo, et al., "User Recognition Via Keystroke Latencies Using SOM and Backpropagation Neural Network", 2009 ICCAS-SICE, 2009, pp. 3160-3165.

Wei, et al., "Visual Cluster Exploration of Web Clickstream Data", Oct. 2012, IEEE.

Ye, et al., "A Personalized Collaborative Filtering Recommendation Using Association Rules Mining and Self-Organizing Map", Journal of Software, vol. 6, No. 4, pp. 732-739, Apr. 2011.

\* cited by examiner

SELF-ORGANIZING MAPS FOR ADAPTIVE INDIVIDUALIZED USER PREFERENCE DETERMINATION FOR RECOMMENDATION SYSTEMS

CROSS-REFERENCE TO RELATED APPLICATIONS

This patent application is a continuation of U.S. patent application Ser. No. 16/031,703, filed on Jul. 10, 2018, and titled "SELF-ORGANIZING MAPS FOR ADAPTIVE INDIVIDUALIZED USER PREFERENCE DETERMINATION FOR RECOMMENDATION SYSTEMS," the contents of which are hereby incorporated by reference in their entirety.

BACKGROUND INFORMATION

A large number of products or services may be available to consumers in particular categories. For example, providers of video content, such as movies and television shows, may manage a product catalog that includes thousands of videos available for consumption. As another example, a seller of apparel may manage a catalog of thousands of different items of apparel available for purchase. A content provider, or a retailer, may increase revenue and customer satisfaction by providing recommendations to a customer. However, providing individualized recommendations to users or customers may present various challenges.

DETAILED DESCRIPTION OF PREFERRED EMBODIMENTS

Figure 1:
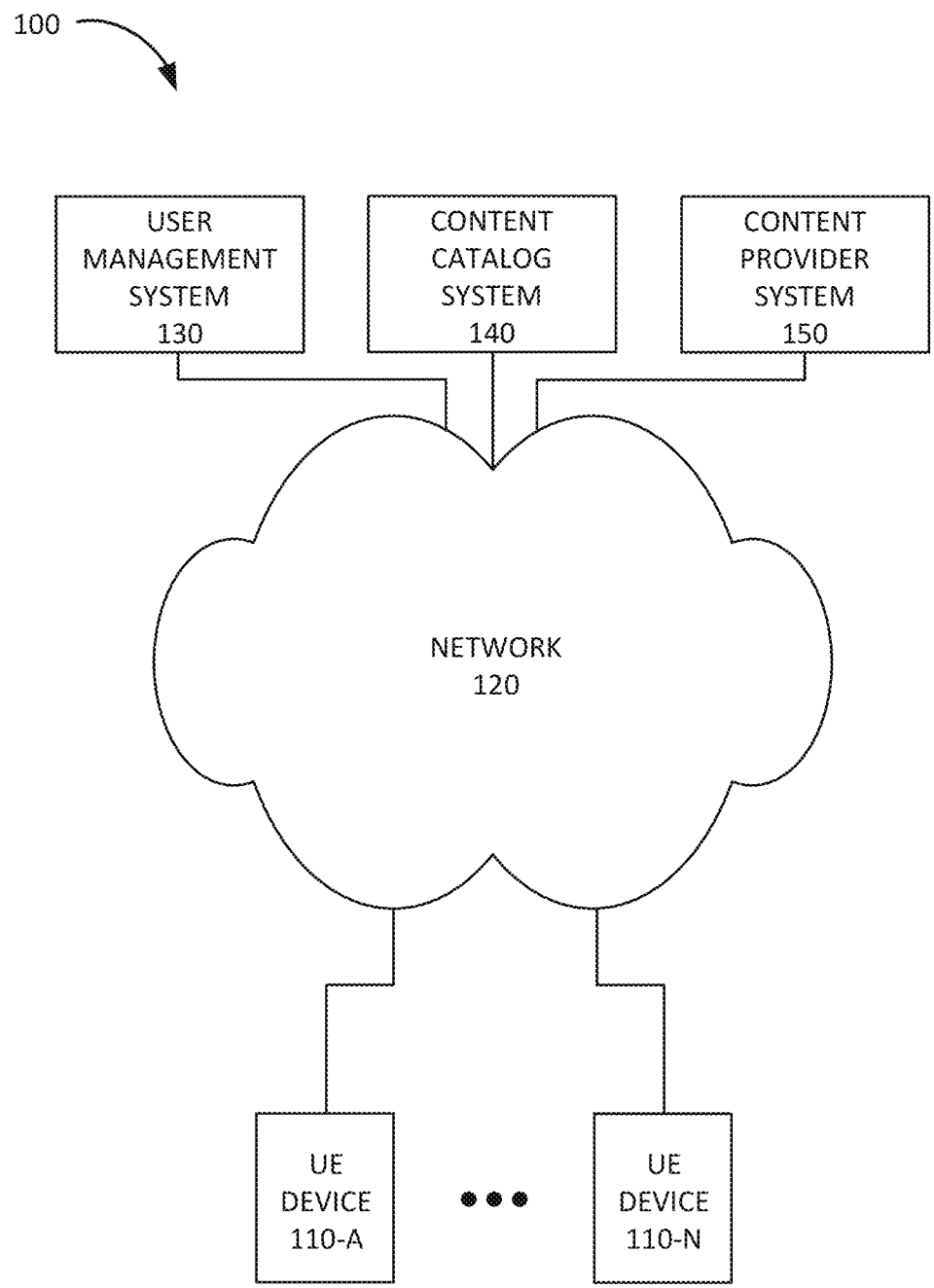
FIG. 1 is a diagram illustrating an environment according to an implementation described herein.

The following detailed description refers to the accompanying drawings. The same reference numbers in different drawings identify the same or similar elements.

Providing personalized recommendations for video content, and/or other types of products or services (e.g., music, video games, apparel, books, art, etc.), may be achieved by collaborative filtering techniques. For example, personalized recommendations may be provided using item-item or item-user collaborative filtering or with combination of content filtering techniques based on particular criteria. However, while collaborative filtering techniques may be effective at providing personalized recommendations at a coarse level, the similarity measures used to determine related content items are not varied based on user characteristics. Thus, collaborative filtering may not be able to provide accurate recommendations in many situations.

For example, with respect to a content catalog of video items, such as movies, television shows, documentaries, comedy specials, etc., a first user may be interested in any action movie that is popular, while a second user may have a very personalized set of criteria that distinguishes a watch-worthy movie from other movies. Sometimes, the second user may not even be consciously aware of the criteria the second user employs to categorize a movie as a "good quality" movie.

Furthermore, a user's preferences may change over time. For example, a user may focus on a first genre of movies during a first time period and then may change to focus on a second genre of movies during a second time period. Moreover, a user's method of choosing movies in unfamiliar genres or previously unwatched types of movies may be similar. For example, a user who regularly selects action movies to watch may use a similar set of criteria when selecting other types of movies, such as international movies or documentaries.

A user may also be interested in a small subset of content items that are of interest to a particular group of users. For example, a user may be interested in European war movies, which may be an intersection of a first list of movies watched by a first group of users interested in war movies and a second list of movies watched by a second group of users interested in European movies.

The above examples illustrate a need for an adaptive process to map the similarity of items in a content catalog with respect to a user, or a group of users. Implementations described herein relate to self-organizing maps for adaptive individualized user preference determination for recommendation systems. A self-organizing map (SOM), also sometimes referred to as a "Kohonen map," or a "Kohonen SOM," is a type of artificial neural network that is trained using unsupervised learning to produce a low-dimensional discretized representation of a feature space based on a training set of input vectors. Thus, generating a SOM for a set of input vectors in the feature space, where each dimension corresponds to a particular feature, is a machine learning (ML) method that may be classified as a dimensionality reduction process and may be considered a nonlinear generalization of principal component analysis.

SOMs differ from other types of neural networks in that the weights for each node in a SOM are a characteristic of the node itself, rather than being used as inputs into an activation function to determine the output of a node, as in other types of artificial neural networks. Rather, in a SOM, the weights associated with a node correspond to coordinates of that node in the feature space. SOMs also differ from other types of neural networks in that they apply competitive learning as opposed to error-correction learning, such as backpropagation with gradient descent. Furthermore, SOMs use a neighborhood function to preserve the topological properties of the input vectors in the feature space.

A SOM may exhibit several properties that may be useful in determining similarities for items in a content catalog with respect to a user, or a group of users. For example, a SOM may correspond to an approximation of the input space and may function as an auto-encoder by approximating higher dimensional input into a lower dimensional output space, which may result in formation of clusters in the data in the lower dimensional output space. Furthermore, a SOM may exhibit topological ordering, so that if a first point is close to a second point in the input space, a projection of the first point in the SOM is close to a projection of the second point in the SOM. Moreover, a SOM may exhibit density matching with respect to the input space, so that variations in the statistics of the input distribution are reflected in the SOM. For example, items that are more frequent in the input set are mapped to a larger area in the SOM. A SOM may also perform feature selection, so that when presented with a non-linear distribution in the input data, the SOM may select the best features to approximate the distribution. Additionally, a SOM may exhibit cortical magnification, meaning that the SOM may adaptively capture a higher amount of variation in features that are associated with a higher input distribution.

A process of generating a SOM may include initialization of the weights to random values and then performing iterative sampling of the input set until the weights converge. Each iteration may include selecting an input vector from the input space, and determining the winning neuron based on which neuron is the closest to the selected input vector based on:

$$d_j(x) = \Sigma_{i=1}^{D}(x_i - w_{ji})^2 \quad \text{(Eq. 1)}$$

where $x_i$ corresponds to value of the i-th dimension of an input vector X, $w_{ji}$ corresponds to the value of the i-th dimension of the weight vector for node $W_j$, D corresponds to the number of features or dimensions of the input space, and $d_j$ corresponds to the distance of node $W_j$ from input vector X. The node $W_j$ of the SOM with the smallest value of $d_j$ is selected as the best matching unit (BMU) of the SOM.

After the BMU is determined, the weights of the BMU and the neighbors of the BMU are updated based on the input vector X using the following equation:

$$w_j(t+1) = w_j(t) + h_{cj}(t)*(x(t) - w_j(t)) \quad \text{(Eq. 2)}$$

where $w_j$ corresponds to the j-th node, t corresponds to the current iteration, x corresponds to the current input vector, and 1140 corresponds to $$h_{cj}(t) = \eta(t) * e^{\left(\frac{\|r_c - r_j\|^2}{2\delta(t)^2}\right)} \quad \text{(Eq. 3)}$$

where $\|r_c - r_j\|$ corresponds to the distance between the BMU and a neighbor node, $\eta(t)$ corresponds to the learning rate, and $\delta(t)$ corresponds to the influence radius that defines the neighborhood of the BMU. Thus, the adjusted weight may be based on the current weight plus the difference between the current weight and the input vector, adjusted based on the learning rate. The learning rate $\eta(t)$ may be defined as:

$$\eta(t) = \eta_0 * e^{\frac{-t}{\lambda}} \quad \text{(Eq. 4)}$$

where $\eta_0$ is the initial learning rate and $\lambda$ is a learning rate constant. The influence radius $\delta(t)$ may be defined as:

$$\delta(t) = \delta_0 * e^{\frac{-t}{\frac{\lambda}{\log(\delta_0)}}} \quad \text{(Eq. 5)}$$

where $\delta_0$ corresponds to the initial influence radius. Therefore, the effect of the learning is proportional to the distance of each node from the BMU. Furthermore, as shown in Equations 4 and 5, the learning rate and/or the influence radius may decrease with each iteration. The process of selecting an input vector, determining the BMU, and adjusting the weights of the SOM may be repeated until the weights of the SOM are changing less than a threshold value per iteration, resulting in convergence for the SOM.

Implementations described herein relate to generating different SOMs for different users. A SOM for a user may be generated, by a computer device associated with a recommendation system, based on consumption information associated with the user. With respect to video content items, for example, the consumption information may include information identifying whether the user watched, purchased, rented, rated, liked, bookmarked, reviewed, and/or otherwise interacted with a particular video content item; and/or the user's rating for the particular video content item, how much of the particular video content item the user watched, whether the user recommended the particular video content item to another user, etc.

Input vectors for the content catalog items may be generated based on a set of features. For example, with respect to video content items, the features may include content type features, genre features, review features, rating features, actor and/or director features, language features, length features, and/or other types of features that may be used to describe a movie, television show, comedy special, and/or another type of video content. The obtained consumption information for the user may be added to the particular video content items, with which the user has interacted, as additional features/dimensions of the input vectors corresponding to the particular video content items. Thus, input vectors for the particular video content items with which the user has interacted may be generated with a first set of dimensions based on the categories/features associated with the particular video content items and a second set of dimensions/features based on the consumption information associated with the user with respect to the particular video content items. The generated input vectors may then be used to generate a SOM associated with the user. The SOM may be updated at particular intervals and/or when new consumption information for the user becomes available.

Implementations described herein relate to using the generated SOM for the user to provide recommendations to the user with respect to a particular content item. The computer device, associated with the recommendation system, may be configured to receive a selection of a content catalog item from a user; generate an input vector based on the selected content catalog item or the search query; map the generated input vector onto one or more points on the SOM associated with the user; select a set of points within a particular distance of the one or more points; reverse map the selected set of points to a group of content catalog items using the self-organizing map associated with the user; and present one or more of the group of content catalog items to the user as recommended content catalog items for the user that are similar to the selected content catalog item. Selecting the set of points within the particular distance of the one or more points may include defining a neighborhood diameter and selecting the set of points as points within the defined neighborhood diameter of the one or more points.

Implementations described herein relate to using the generated SOM for the user to provide recommendations to the user with respect to a search query. The computer device, associated with the recommendation system, may be configured to receive a search query from the user; generate one or more partial input vectors based on one or more terms or parameters included in the search query; map the generated one or more partial input vectors onto one or more points on the SOM associated with the user; select a set of points within a particular distance of the one or more points; reverse map the selected set of points to a group of content catalog items using the self-organizing map associated with the user; and present one or more of the group of content catalog items to the user as the results of the search query. If the computer device determines that a SOM for the user does not exist, the computer device may determine a user category associated with the user and select a default SOM for the determined user category as the self-organizing map associated with the user.

Implementations described herein relate to using SOMs generated for different users to generate user clusters. For example, the computer device, associated with the recommendation system, may select a set of users; generate user clusters for the selected set of users based on SOMs associated with the selected set of users; and provide content catalog recommendations to particular ones of the selected set of users based on the generated user clusters. Generating the user clusters may include obtaining consumption information for the selected set of users relating to content catalog items in the content catalog; generating related content results for catalog content items included in the obtained consumption information for the selected set of users using the SOMs associated with the selected set of users; selecting a distance metric for user similarity; computing pairwise distances for the generated related content results for each pair of users in the selected set of users using the selected distance metric; and using a clustering method to generate the user clusters based on the computed pairwise distances.

FIG. 1 is a diagram of an exemplary environment 100 in which the systems and/or methods, described herein, may be implemented. As shown in FIG. 1, environment 100 may include UE devices 110-A to 110-N (referred to collectively as "UE devices 110" and individually as "UE device 110"), a network 120, a user management system 130, a content catalog system 140, and a content provider system 150.

UE device 110 may include a handheld wireless communication device (e.g., a mobile phone, a smart phone, etc.); a laptop computer, a tablet computer, or another type of portable computer; a desktop computer device; a wearable computer device (e.g., a head-mounted display computer device, a head-mounted camera device, a wristwatch computer device, etc.), a global positioning system (GPS) device; a media playing device; a portable gaming system; and/or any other type of computer device with communication capabilities, the capability to connect to network 140, and a user interface. UE device 110 may be used for voice communication, mobile broadband services (e.g., video streaming, real-time gaming, premium Internet access etc.), best effort data traffic, and/or other types of applications.

Network 120 may include a local area network (LAN), a wide area network (WAN), a metropolitan area network (MAN), an optical network, a cable television network, a satellite network, an ad hoc network, a telephone network (e.g., the Public Switched Telephone Network (PSTN) or a cellular network), an intranet, or a combination of networks. Additionally, network 120 may include a wireless access network (e.g., a CDMA network, a general packet radio service (GPRS) network, and/or an LTE network) that provides access to network 120 for wireless communication devices via one or more base stations (not shown in FIG. 1) and establishes an Internet Protocol (IP) connection between UE device 110 and network 120. For example, network 120 may include an LTE network, an LTE Advanced (LTE-A) access network, and/or a Fifth Generation (5G) access network or other advanced network that includes 5G New Radio (NR) air interface functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

In some implementations, network 120 may include an Internet Protocol Multimedia Sub-system (IMS) network (not shown in FIG. 1). An IMS network may include a network for delivering IP multimedia services and may provide media flows between UE device 110 and external IP networks or external circuit-switched networks (not shown in FIG. 1).

User management system 130 may include one or more devices, such as computer devices, network devices, and/or server devices, which manage user information. For example, user management system 130 may maintain account information associated with particular users. The account information may include, for example, consumption information relating to catalog items associated with content catalog system 150 and/or content provider system 150.

Content catalog system 140 may include one or more devices, such as computer devices, network devices, and/or server devices, which maintain a content catalog. For example, content catalog system 140 may maintain a web site that enables a user to visit a web page and browse a content catalog of items available for consumption (e.g., available for purchase, rental, subscription, etc.). As an example, content catalog system 140 may host a web site for browsing and selecting video content items for watching, such as movies, television shows, comedy specials, sports broadcasts, videos uploaded by users, and/or other types of video content. As another example, content catalog system 140 may maintain a catalog of audio content, such as music and/or audiobooks. As yet another example, content catalog system 140 may maintain a catalog of video games. As yet another example, content catalog system 140 may maintain a catalog of apparel, books, art, and/or other types of retail items.

Content provider system 150 may include one or more devices, such as computer devices, network devices, and/or server devices, which deliver content associated with content catalog system 140 to UE devices 110. For example, content catalog system 140 may deliver (e.g., stream, download, etc.) a video content item, selected by a user via content catalog system 140, to UE device 110. As another example, content provider system 150 may deliver (e.g., stream, download, etc.) an audio file or a game, selected by a user via content catalog system 140, to UE device 110. As yet another example, content provider system 150 may fulfill a retail order, selected by a user of UE device 110 via content catalog system 140, by instructing an employee to ship the order to the user.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
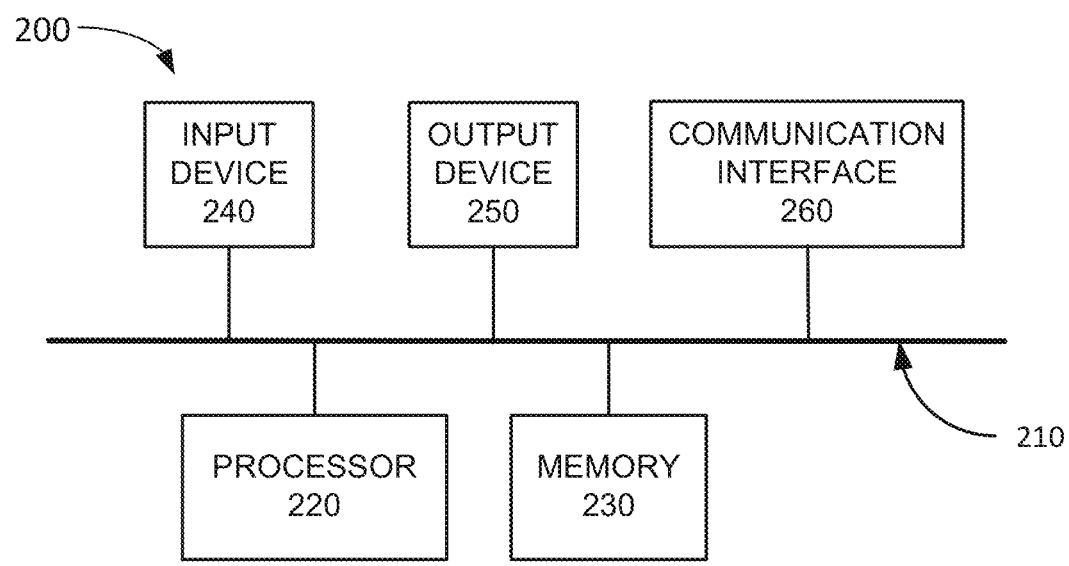
FIG. 2 is a diagram illustrating exemplary components of a device that may be included in a device or system of FIG. 1.

FIG. 2 is a diagram illustrating example components of a device 200 according to an implementation described herein. UE device 110, user management system 130, content catalog system 140, and/or content provider system 150 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to generating SOMs for users and providing recommendations to the users based on the generated SOMs. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
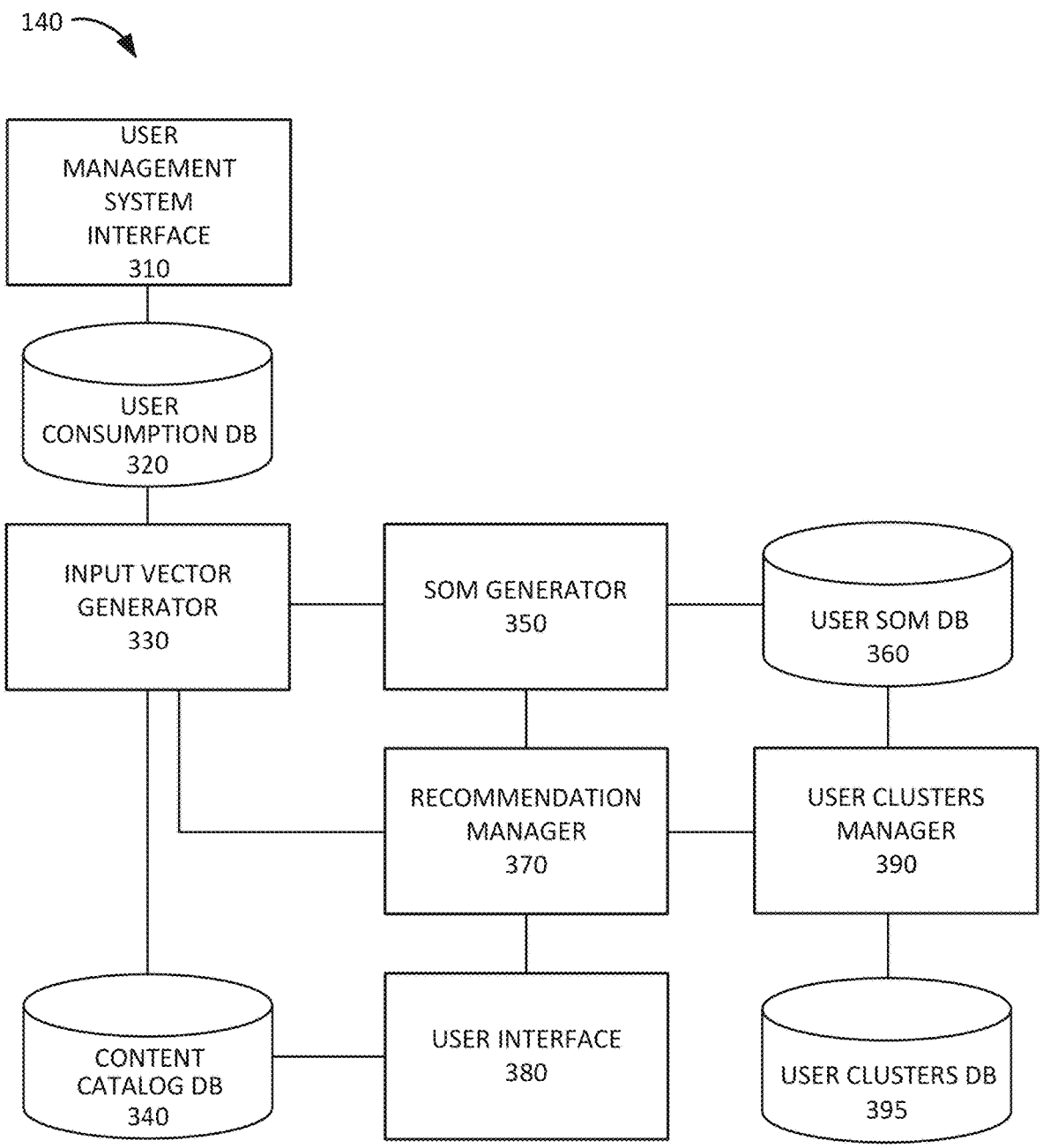
FIG. 3 is a diagram illustrating exemplary functional components of the content catalog system of FIG. 1.

FIG. 3 is a diagram illustrating exemplary functional components of content catalog system 140. The functional components of content catalog system 140 may be implemented, for example, via processor 220 executing instructions from memory 230. Alternatively, some or all of the functional components included in content catalog system 140 may be implemented via hard-wired circuitry. As shown in FIG. 3, content catalog system 140 may include a user management system interface 310, a user consumption database (DB) 320, an input vector generator 330, a content catalog DB 340, a SOM generator 350, a user SOM DB 360, a recommendation manager 370, a user interface 380, a user clusters manager 390, and a user clusters DB 395.

User management system interface 310 may be configured to communicate with user management system 130. For example, user management system interface 310 may obtain consumption information for particular users from user management system 130 at particular intervals, and/or in response to new data being available, and may store the received consumption information in user consumption DB 320.

User consumption DB 320 may store consumption information relating to particular users. For each particular user, user consumption DB 320 may store information identifying content catalog items with which the user has interacted. For example, user consumption DB 320 may store, for each content catalog item with which the user has interacted, whether the user watched, purchased, rented, rated, liked, bookmarked, reviewed, and/or otherwise interacted with the catalog content item and/or the user's rating for the catalog content item, how much of the catalog content item the user watched, whether the user recommended the content catalog item to another user, etc.

Input vector generator 330 may generate input vectors based on information stored in user consumption DB 320 and content catalog DB 340. Content catalog DB 340 may store information relating to particular content catalog items. For each content catalog item, content catalog DB 340 may store information identifying particular categories associated with the content catalog item. For example, if content catalog system 140 includes a catalog of video items, content catalog DB 340 may store, for each video item, metadata that includes information identifying a type of the video content item (e.g., movie, television show episode, sporting event, comedy special, etc.), a genre of the video content item (e.g., drama, comedy, action, animation, suspense, etc.), people associated with the video content item (e.g., actors/actresses, director, producer, script writer, etc.), a language associated with the video content item, a length or duration associated with the video content item, a description associated with the video content item, a rating associated with the video content item, a review associated with the video content item, and/or other types of metadata associated with the video content item.

Input vector generator 330 may generate input vectors based on information stored in user consumption DB 320 and content catalog DB 340. For example, for a particular user, for each catalog content item with which the particular user interacted, input vector generator 330 may generate an input vector based on the category information for the catalog content item stored in content catalog DB 340 and on the content consumption information for the catalog content item stored in user consumption DB 340. Thus, the input vector for the catalog content item for the particular user may include a first set of values for a first set of dimensions/features based on the categories associated with the catalog content item and a second set of values for a second set of dimensions/features based on the consumption information associated with the user for the catalog content item. Furthermore, input vector generator 330 may generate a partial input vector based on a search query input by a user. The partial input vector may be mapped onto the SOM associated with the user to identify content catalog items that satisfy the search query and that are similar to content catalog items that are preferred by the user.

SOM generator 350 may generate a SOM for a particular user, or for a particular group of users, based on input vectors generated for the particular user by input vector generator 330 and may store the generated SOM in user SOM DB 360. Exemplary information that may be stored in user SOM DB 360 is described below with reference to FIG. 4. Recommendation manager 370 may generate a recommendation for a particular user based on a SOM associated with the user. As an example, recommendation manager 370 may generate a "More Like This" recommendation based on a selected content catalog item to provide to the user content catalog items that are similar to the selected content catalog item. As another example, recommendation manager 370 may generate a list of content catalog items based on a search query input by a user using a SOM associated with the user. As yet another example, recommendation manager 370 may generate a recommendation based on a user cluster associated with the user. User interface 380 may generate a user interface that enables a user to request and receive recommendations relating to content catalog items and/or search queries generated by the user.

User clusters manager 390 may determine user clusters information based on SOMs associated with particular users and may store the determined user clusters information in user clusters DB 395. For example, user clusters manager 390 may select a set of users, generate content consumption information for each of the users in the selected set of users, and generate related content results for content catalog items identified in the obtained content consumption information. User clusters manager 390 may compute pairwise distances for each pair of users using the generated related content results using a distance metric and may generate user clusters based on the computed pairwise distances using a clustering technique. The generated user clusters may be used to define user groups and the defined user groups may be used to provide recommendations.

Although FIG. 3 shows exemplary components of content catalog system 140, in other implementations, content catalog system 140 may include fewer components, different components, additional components, or differently arranged components than depicted in FIG. 3. Additionally or alternatively, one or more components of content catalog system 140 may perform one or more tasks described as being performed by one or more other components of content catalog system 140.

Figure 4:
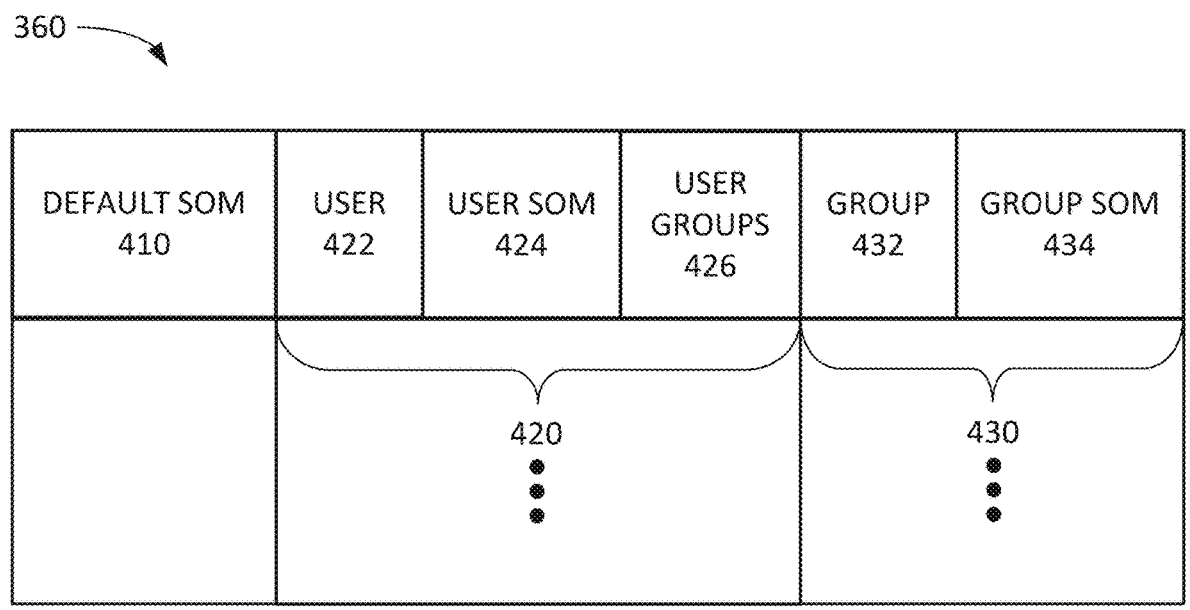
FIG. 4 is a diagram illustrating exemplary components of the user self-organizing maps database of FIG. 4.

FIG. 4 is a diagram illustrating exemplary components of user SOM DB 360. As shown in FIG. 4, user SOM DB 360 may include a default SOM record 410, one or more user SOM records 420, and one or more group SOM records 430.

Default SOM record 410 may store a default SOM associated with content catalog system 140. Default SOM record 410 may be generated using information stored in content catalog DB 340 without using any consumption information associated with users. Thus, default SOM may reflect inherent similarities in content catalog items independent of any particular users. The default SOM may be used to generate a recommendation when a SOM is not available for a particular user.

Each user SOM record 420 may store information relating to a SOM associated with a particular user. SOM record 420 may include a user field 422, a user SOM field 424, and a user groups field 426. User field 422 may store information identifying a particular user. For example, user field 422 may store information identifying a user account associated with content catalog system 140. Additionally or alternatively, user field 422 may store information identifying a particular UE device 110 associated with the particular user, such as, for example, a Media Access Control (MAC) address, an Internet Protocol (IP) address, a Session Initiation Protocol (SIP) address, a Mobile Station International Subscriber Directory Number (MSISDN), an International Mobile Subscriber Identity (IMSI) number, a Mobile Directory Number (MDN), and/or by another type of identifier associated with the particular UE device 110.

SOM field 424 may store a SOM associated with the particular user. For example, SOM field 424 may store a SOM that includes representation of the feature space of content catalog items in relation to the preferences associated with the particular user based on the consumption information associated with the particular user.

User groups field 426 may store information identifying one or more user groups associated with the particular user. For example, user groups field 426 may identify to which user groups, identified by group SOM records 430, the particular user belongs. Each group SOM record 430 may store information relating to a SOM associated with a particular user group. Group SOM record 430 may include a SOM for a particular user group. Group SOM record 430 may include a group field 432 and a group SOM field 434. Group field 432 may identify a particular user group and group SOM field 434 may store a SOM associated with the particular user group. The group SOM for the particular user group may be generated based on content consumption information associated with users that belong to the particular user group. The consumption information for the users may be aggregated before input vectors for the group SOM are generated.

As an example, group field 432 may identify a particular user demographic (e.g., based on age, sex, language, etc.) associated with the particular user group, may identify a particular geographic area associated with the particular user group, may identify an interest associated with the particular user group based on information provided by users in a user profile, and/or may include another parameter that may be used to define a user group. Furthermore, in some implementations, user groups may be defined based on user clusters determined by user clusters manager 390.

Although FIG. 4 shows exemplary components of connections DB 440, in other implementations, connections DB 440 may include fewer components, different components, additional components, or differently arranged components than depicted in FIG. 4.

Figure 5:
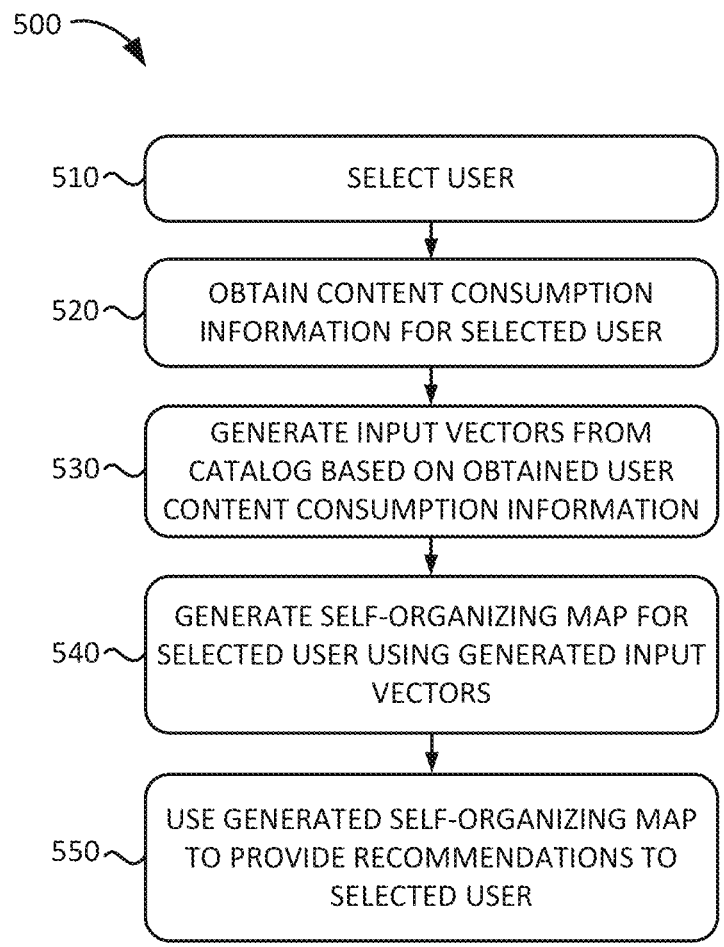
FIG. 5 is a flowchart of a process for generating a self-organizing map for a user according to an implementation described herein.

FIG. 5 is a flowchart of a process for generating a self-organizing map for a user according to an implementation described herein. In some implementations, the process of FIG. 5 may be performed by content catalog system 140. In other implementations, some or all of the process of FIG. 5 may be performed by another device or a group of devices separate from content catalog system 140, such as, for example, user management system 130 and/or content provider system 150.

The process of FIG. 5 may include selecting a user (block 510). For example, SOM generator 350 may instruct input vector generator 330 to select a user that is associated with a content consumption record stored in user consumption DB 320. Content consumption information for the user may be obtained and input vectors from the catalog may be generated based on the obtained consumption information (block 520). For example, input vector generator 330 may identify content catalog items for which consumption information exists for the user in user consumption DB 320. Input vector generator 330 may then retrieve feature information for each identified content catalog item, may generate an n-dimensional input vector based on the retrieved feature information, and may add k dimensions to the generated input vector based on the consumptions information associated with the identified content catalog item.

Each vector dimension may be discrete or continuous, and may be an integer type, a positive value integer type, a real-valued type, a Boolean type, a ternary type, a string type, and/or another type. When a particular characteristic or feature is represented by a list of feature string enumerations, the particular characteristic or feature may be represented by a Boolean type. For example, video content items may be tagged with genre information and each genre may be represented by a dimension associated with a Boolean type. Thus, an input vector for a movie may include a first Boolean type dimension corresponding to an action genre (e.g., a "0" value indicating the movie is not an action movie and a "1" value indicating the movie is an action movie), a second Boolean type dimension corresponding to a comedy genre, a third Boolean type dimension corresponding to a drama genre, etc.

Similarly, consumption information for the movie may be represented by one or more Boolean type dimensions. For example, the input vector for the movie may include a first Boolean type dimension indicating whether the user watched the movie, a second Boolean type dimension indicating whether the user purchased the movie, a third Boolean type dimension indicating whether the user rated the movie, a fourth Boolean type dimension indicating whether the user bookmarked the movie, etc. Additionally or alternatively, the input vector for the movie may include non-Boolean dimensions relating to the consumption information for the user, such as dimension that stores a rating value assigned to the movie by the user, a dimension indicating how much of the movie the user has watched, a dimension indicating how many times the user has accessed a web page in the content catalog associated with the movie, etc.

A SOM for the selected user may be generated using the generated input vectors (block 540) and the generated SOM may be used to provide recommendations to the selected user (block 550). For example, SOM generator 350 may train a SOM using the input vectors associated with the user until the SOM converges (e.g., the SOM changes with each iteration less than a change threshold, etc.). The number of dimensions for the SOM may be selected based on empirical results. For example, a default number of dimensions may be selected based on the number of dimensions of the input vectors and the selected number of dimensions may be increased or decreased if the performance of the SOM is determined to be unsatisfactory (e.g., the SOM does not converge, the SOM generates too many results when using the SOM to generate a recommendation, the SOM generates too few results when using the SOM to generate a recommendation, etc.). The generated SOM may be used to provide recommendations to the user as explained below with reference to FIGS. 6 and 7. The generated SOM may be updated at particular intervals and/or when new consumption information for the user becomes available.

Figure 6:
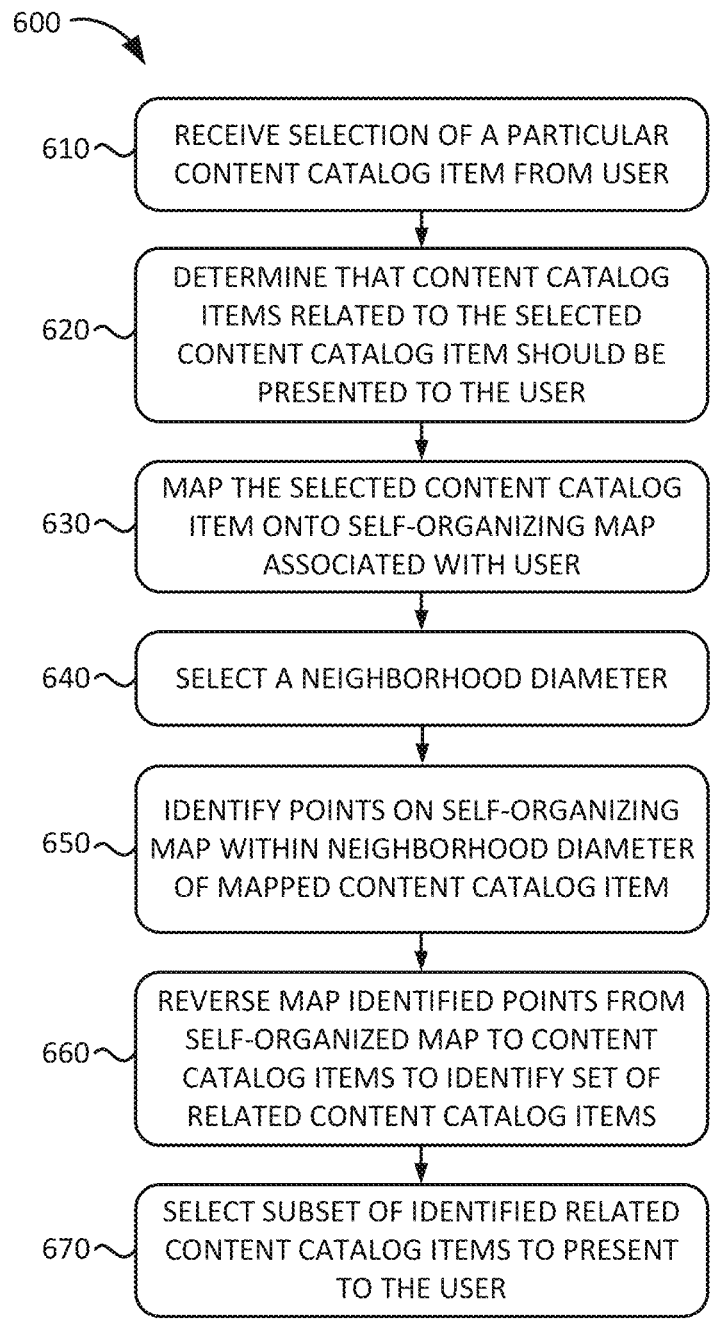
FIG. 6 is a flowchart of a process for providing a recommendation to a user based on a particular content catalog item according to an implementation described herein.

FIG. 6 is a flowchart 600 of a process for providing a recommendation to a user based on a particular content catalog item according to an implementation described herein. In some implementations, the process of FIG. 6 may be performed by content catalog system 140. In other implementations, some or all of the process of FIG. 6 may be performed by another device or a group of devices separate from content catalog system 140, such as, for example, user management system 130 and/or content provider system 150.

The process of FIG. 6 may include receiving a selection of a particular content catalog item from a user (block 610). A user may access a web page of the content catalog hosted by content catalog system 140 and may access a web page associated with a particular content catalog item. For example, the user may be browsing movies and may be viewing a web page associated with a particular movie. A determination may be made that the content catalog items related to the selected content catalog item should be presented to the user (block 620). As an example, recommendation manager 370 may determine that an area of the web page associated with the selected content catalog item should be filled with recommended content catalog items associated with the selected content catalog item. As another example, the user may request related content catalog items (e.g., by clicking on a "More Like This" selection object, etc.). In response, recommendation manager 370 may use the SOM associated with the user to identify the related content catalog items.

The selected content catalog item may be mapped onto the SOM associated with the user (block 630), a neighborhood diameter may be selected (block 640), and points on the SOM within the selected neighborhood diameter may be identified (block 650). For example, SOM generator 350 may map the selected content catalog onto the SOM associated with the user, select a neighborhood diameter, and identify all points on the SOM associated with the user that are within the selected neighborhood diameter. In some implementations, a default neighborhood diameter may be selected. In other implementations, a neighborhood diameter may be selected based on how many related content catalog items should be identified. For example, a larger neighborhood diameter may result in a larger number of related content catalog items being identified.

Furthermore, in other implementations, instead of using a single neighborhood diameter, related content catalog items may be identified based on an ascending distance from the mapped point on the SOM. For example, a first set of related items may be identified using a first neighborhood diameter as the most closely related items and a second set of related items may be identified using a second neighborhood diameter, greater than the first neighborhood diameter, as less closely related items.

The identified points may be reverse mapped from the SOM to content catalog items to identify a set of related content catalog items (block 660). For example, SOM generator 350 may reverse map the points on the SOM that are within the selected neighborhood diameter to content catalog items by reverse mapping the point into the feature space of the input vectors. If a particular point on the SOM does not reverse map to a particular content catalog item, the closest content catalog item to the reverse mapped point may be selected as a related content catalog item.

A selected subset of the identified related content catalog items may be presented to the user (block 670). Recommendation manager 370 may select a subset of the identified related content catalog items to present to the user via user interface 380, because the number of identified related content catalog items may be greater than the number of items that may be presented to the user in a user interface. For example, the number of related content catalog items may be selected based on the available space in an area of the user interface for presenting "More Like This" content catalog items related to the selected content catalog item. In some implementations, the related content catalog items may be ranked based on one or more parameters, such as popularity, recency, price, and/or another parameter, and a subset of the identified video content items with the highest ranks may be presented to the user. In other implementations, the identified video content items may be randomly sampled to present a subset of the identified related video content items to the user.

Figure 7:
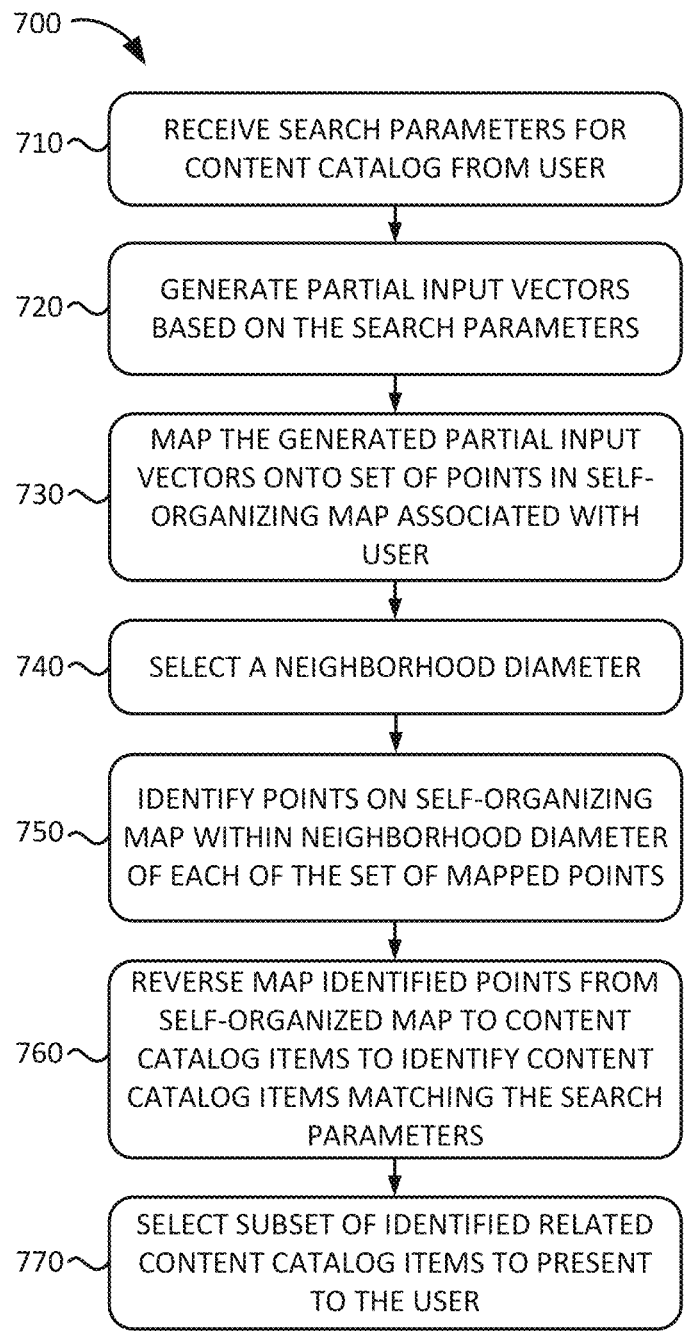
FIG. 7 is a flowchart of a process for providing a recommendation to a user based on a search query according to an implementation described herein.

FIG. 7 is a flowchart 700 of a process for providing a recommendation to a user based on a search query according to an implementation described herein. In some implementations, the process of FIG. 7 may be performed by content catalog system 140. In other implementations, some or all of the process of FIG. 7 may be performed by another device or a group of devices separate from content catalog system 140, such as, for example, user management system 130 and/or content provider system 150.

The process of FIG. 7 may include receiving search parameters for the content catalog from a user (block 710). User interface 380 may receive a search query from a user via UE device 110. As an example, a user may enter one or more search terms in a text box. As another example, a user may select one or more search parameters by clicking on one or more selection objects (e.g., with respect to video content items, by selecting a genre, a rating requirement, a release year, etc.).

Partial input vectors may be generated based on the received search parameters (block 720). For example, input vector generator 330 may generate a partial search vector in which values are included for dimensions that correspond to parameters that the user has specified. For example, a user may specify a movie genre, but may not specify a release year or a particular critics score rating for a search query. Components of the input vector that correspond to unspecified parameters may not include defined values and may span the entire range of possible values.

The generated partial input vectors may be mapped onto the SOM associated with the user (block 730), a neighborhood diameter may be selected (block 740), and points on the SOM within the selected neighborhood diameters may be identified (block 750). For example, SOM generator 350 may map the generated partial input vectors onto the SOM. Each partial input vector may map onto a set of points in the SOM associated with the user. SOM generator 350 may then select a neighborhood diameter, and identify all points on the SOM that are within the selected neighborhood diameter for each of the mapped set of points.

In some implementations, instead of using a single neighborhood diameter, related content catalog items may be identified based on an ascending distance from each the mapped point on the SOM. For example, a first set of content catalog items may be identified using a first neighborhood diameter as the content catalog items most closely matching the search parameters and a second set of content catalog items may be identified using a second neighborhood diameter, greater than the first neighborhood diameter, as less closely matching content catalog items.

The identified points may be reverse mapped from the SOM to content catalog items to identify content catalog items matching the search parameters (block 760). For example, SOM generator 350 may reverse map the points on the SOM that are within the selected neighborhood diameter of each of the mapped points by reverse mapping the points into the feature space of the input vectors. If a particular point on the SOM does not reverse map to a particular content catalog item, the closest content catalog item to the reverse mapped point may be selected as a related content catalog item.

A selected subset of the identified related content catalog items may be presented to the user (block 770). Recommendation manager 370 may select a subset of the identified content catalog items to present to the user via user interface 380. For example, the number of related content catalog items may be selected based on the available space in an area of the user interface for presenting search results in response to the user initiating a search. In some implementations, the content catalog items may be ranked based on one or more parameters, such as popularity, recency, price, and/or another parameter, and a subset of the identified video content items with the highest ranks may be presented to the user. In other implementations, the identified content catalog items may be randomly sampled to present a subset of the identified content catalog items to the user.

Figure 8:
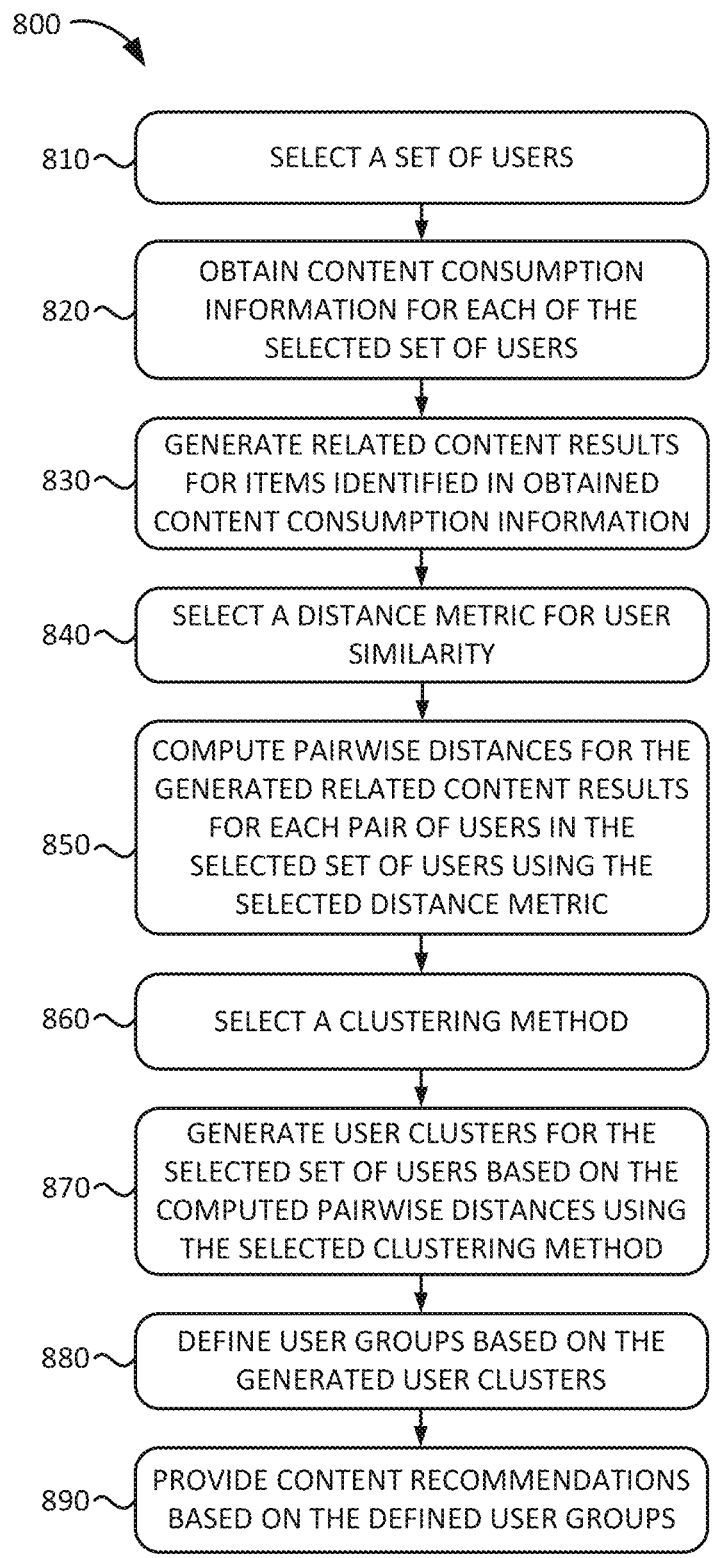
FIG. 8 is a flowchart of a process for generating user groups according to an implementation described herein.

FIG. 8 is a flowchart of a process for generating user groups according to an implementation described herein. In some implementations, the process of FIG. 8 may be performed by content catalog system 140. In other implementations, some or all of the process of FIG. 8 may be performed by another device or a group of devices separate from content catalog system 140, such as, for example, user management system 130 and/or content provider system 150.

The process of FIG. 8 may include selecting a set of users (block 810) and obtaining content consumption information for each user in the selected set of users (block 820). For example, user clusters manager 390 may select a set of users associated with records in user SOM DB 360 and may obtain content consumption information associated with the users from user consumption DB 320. User clusters manager 390 may select all content catalog items consumed by the selected set of users. For example, user clusters manager 390 may select all video content items watched by the users in the selected set of users.

Related content results may be generated for the items identified in the obtained content consumption information (block 830). For each of the identified content catalog items consumed by the selected set of users, related content results may be obtained for each user (e.g., "More Like This" results, etc.) in the selected set of users, using the process described above with respect to FIG. 6.

A distance metric may be selected for user similarity (block 840) and pairwise distances for the generated related content results for each pair of users in the selected set of users may be computed using the selected distance metric (block 850). As an example, user clusters manager 390 may select an overlap percentage for the related content results between two users as a distance metric and thus an indication of similarity in the preferences between the two users. As another example, user clusters manager 390 may select a root mean square error based on an ordered list of results as a distance metric for the related content results between two users. As yet another example, user clusters manager 390 may determine a centroid point for the related content results in the feature space for each of a pair of users and may determine the distance between the centroid points for two users as a distance metric. The particular distance metric may be selected by, for example, comparing empirical clustering results using different distance metrics.

After a pairwise distance for each pair of users is calculated, a clustering method may be selected (block 860) and user clusters may be generated for the selected set of users based on the computed pairwise distances using the selected clustering method (block 870). For example, user clusters manager 390 may select auto-tuned spectral clustering, density-based spatial clustering of applications with noise (DBSCAN), density-link clustering, hierarchical clustering, neural network based clustering, expectation-maximization clustering, and/or another type of clustering technique to determine data clusters for the computed pairwise distances. The selected clustering technique may be used to identify user clusters representing users with similar preferences with respect to consuming content catalog items in content catalog system 140.

User groups may be defined based on the generated user clusters (block 880) and content recommendations may be provided based on the defined user groups (block 890). For example, recommendation manager 370 may define user groups with similar preferences based on the generated user clusters. The user groups may be used to provide recommendations to a user. As an example, recommendation manager 370 may provide to a particular user recommendations of content catalog items that were consumed by other users in a user group to which the particular user belongs. As another example, SOM generator 350 may generate a group SOM for a user group and may store the group SOM in user SOM DB 360. The group SOM may be used to identify "More Like This" content or content satisfying particular search parameters for users that are members of the user group associated with the group SOM.

Figure 9:
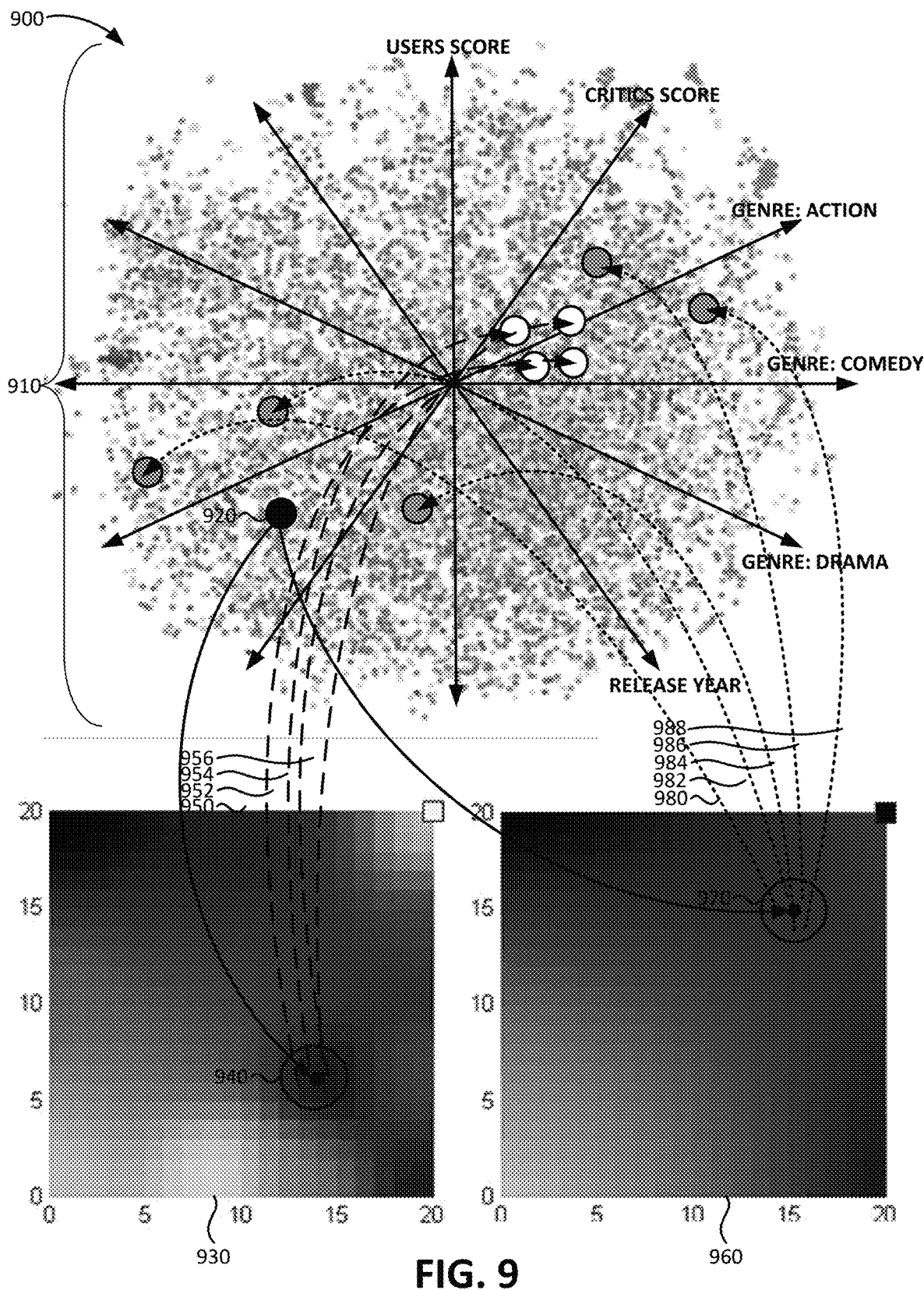
FIG. 9 is a diagram illustrating the generation of a recommendation to users based on a particular catalog content.

FIG. 9 is a diagram 900 illustrating the generation of a recommendation to users based on a particular content catalog item. As shown in FIG. 9, diagram 900 includes a multi-dimensional feature space representation 910 that includes all video content items in content catalog system 140 in the input/feature space. Thus, each point in feature space representation 910 corresponds to a particular video content item mapped in the multi-dimensional feature space based on the values for each dimension of the feature space of the input vector associated with the particular video content item.

Feature space representation 910 illustrates some of the dimensions of the feature space, which may include a users score dimension based on rating scores assigned to video content items by users, a critics score dimensions based on critic scores assigned to video content items by critics, a "genre: action" dimension based on whether a video content item is classified in an action genre, a "genre: comedy" dimension based on whether a video content item is classified in a comedy genre, a "genre: drama" dimension based on whether a video content item is classified in a drama genre, a release year dimension based on the release year associated with the video content item, etc.

Diagram 900 further illustrates how related video content items are identified for a particular video content item 920 for two different users. Assume video content item 920 corresponds to an action movie and assume a first user, associated with a first SOM 930, watches movies in many different genres. Therefore, action movies may corresponds to a small area in first SOM 930. Video content item 920 may map onto an area of first SOM 930 that is used to define a neighborhood 940. The points on first SOM 930 that are within neighborhood 940 may then be reverse mapped back into the feature space. FIG. 9 illustrates four of the points reverse mapped to video content items 950, 952, 954, 956 that correspond to the video content items determined to be related to video content item 920 and that are to be recommended to the first user. If a particular point on first SOM 930 does not map exactly to a video content item in feature space representation 910, the closest video content item to the reverse mapped point may be selected.

As shown in FIG. 9, because the first user, associated with first SOM 930, watches movies in many different genres, the related video content items 950, 952, 954, 956 may be clustered relatively closely together in the feature space, because video content item 920 is an action movie and a "More Like This" recommendation for the first user may result in a coarse-grained recommendation of other action movies.

In contrast, assume a second user, associated with second SOM 960, only watches action movies. Therefore, it may not be sufficient to use an action genre classification for identifying related items for the purposes of determining similarity. However, since in second SOM 960 action movies may take up a large area, second SOM 960 may capture other types of similarities associated with the first user's preferences. Thus, when video content item 920, which corresponds to an action movie, is mapped onto second SOM 960, and a neighborhood 970 is selected in second SOM 960, the points in neighborhood 970 may reverse map to related video content items 980, 982, 984, 986, and 988 that are more distributed with respect to other features of the feature space. Related video content items 980, 982, 984, 986, and 988 may therefore reflect the second user's more refined taste within action movies, compared to the first user.

Figure 10:
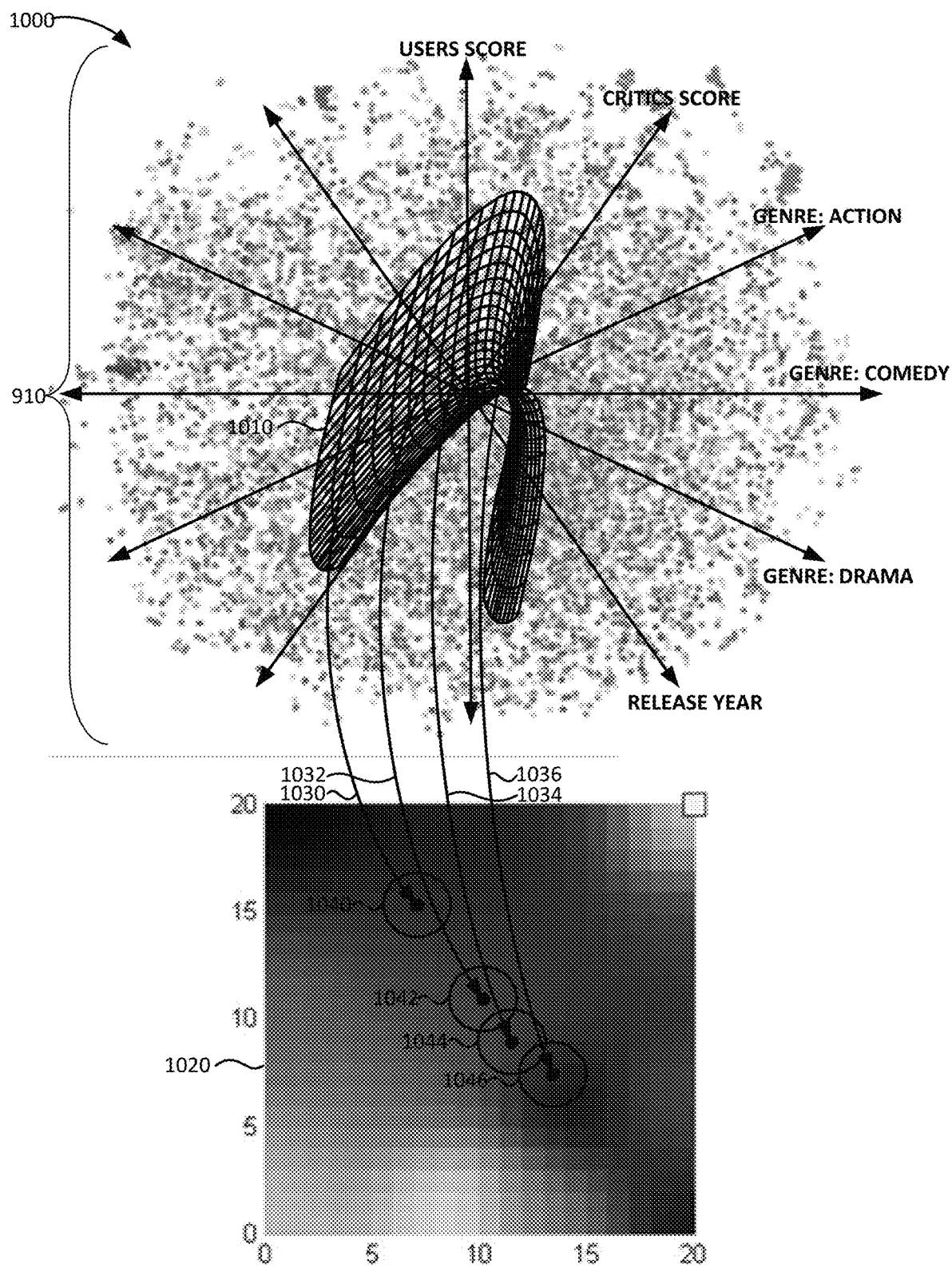
FIG. 10 is a diagram illustrating the generation of a recommendation to a user based on a search query.

FIG. 10 is a diagram 1000 illustrating the generation of a recommendation to a user based on a search query. As shown in FIG. 10, diagram 100 includes feature space representation 910 and a partial input vector 1010 represented as a hyperplane in FIG. 10. When a user enters a search query, by either typing in one or more search terms, or by selecting one or more categories, input vector generator 330 may generate a partial search vector in which values are included for dimensions that correspond to parameters that the user has specified. Dimensions of the input vector that correspond to unspecified parameters may not include defined values. For example, a user may specify a movie genre, but may not specify a release year or a particular critics score rating for a search query. The hyperplane representation illustrates that, in the partial input vector, unspecified dimensions may span the entire range of possible values.

Partial input vector 1010 may map onto a set of points in SOM 1020. Each of the set of points may be used to define a neighborhood. For example, partial input vector 1010 may map onto points 1030, 1032, 1034, and 1036 and neighborhoods 1040, 1042, 1044, and 1046 may be defined based on points 1030, 1032, 1034, and 1036, respectively. The points within each of the neighborhoods 1040, 1042, 1044, and 1046 may then be reversed mapped into feature space representation 910 to identify video content items that satisfy the parameters of the search query (not shown in FIG. 10).

The identified video content items that satisfy the search query may then be ranked based on one or more parameters, such as popularity, recency, price, and/or another parameter, and a subset of the identified video content items with the highest ranks may be presented to the user as the results of the search query. In other implementations, the identified video content items may be randomly sampled to present a subset of the identified video content items as the results of the search query.

Figure 11:
FIG. 11 is a diagram illustrating an exemplary user interface according to an implementation described herein.

FIG. 11 is a diagram illustrating an exemplary user interface 1100 according to an implementation described herein. User interface 1100 may be presented to a user on UE device 110 when the user accesses a web page hosted by content catalog system 140. As shown in FIG. 11, user interface 1100 may include a first area 1110 that displays a content catalog item and a second area 1120 that displays "More Like This" results corresponding to the displayed content catalog item, generated using a SOM generated for the user based on the user's content consumption information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 5-8, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:

generating, by a computer device, a self-organizing map for a user of a content catalog using categories associated with content catalog items in the content catalog and information that identifies whether the user has interacted with particular content catalog items in the content catalog, wherein generating the self-organizing map for the user of the content catalog includes:
generating a set of input vectors to train the self-organizing map, wherein each of the set of input vectors includes a first set of dimensions based on the categories associated with a particular catalog item and a second set of dimensions based on consumption information for the user with respect to the particular content catalog item;

assigning, by the computer device, the self-organizing map to the user by storing the self-organizing map in a user record for the user in a database, wherein the database includes different self-organizing maps for different users, and includes, for each particular user, a self-organizing map assigned to only the particular user and generated based on only the particular user's consumption information with respect to the content catalog;

generating, by the computer device, a default self-organizing map using categories associated with content catalog items in the content catalog;

receiving, by the computer device, a selection of a content catalog item or a search query;

selecting, by the computer device, one or more content catalog items from the content catalog using the stored self-organizing map for the user based on the received selection of the content catalog item or the received search query, when the selection of the content catalog item or the search query is received from the user;

selecting, by the computer device, one or more content catalog items from the content catalog using the generated default self-organizing map based on the received selection of the content catalog item or the received search query, wherein the default self-organizing map is generated without using consumption information associated with users of the content catalog, when the selection of the content catalog item or the search query is received from another user that is not associated with a self-organizing map stored in the database; and providing, by the computer device, the selected one or more content catalog items from the content catalog to the user or the other user as a recommendation based on whether the selection of the content catalog item or the search query was received from the user or from the other user that is not associated with the self-organizing map stored in the database.

2. The method of claim 1, wherein selecting the one or more content catalog items from the content catalog using the stored self-organizing map includes:

generating an input vector for the received selection of the content catalog item or the search query;

mapping the generated input vector onto the stored self-organizing map to identify one or more points on the self-organizing map;

selecting a set of points within a particular distance of the identified one or more points; and reverse mapping the selected set of points to one or more content catalog items in the content catalog.

3. The method of claim 1, wherein the first set of dimensions includes at least one of one or more dimensions representing:

a type associated with a content catalog item;
a genre associated with a content catalog item;
people associated with a content catalog item;
a language associated with a content catalog item;
a description associated with a content catalog item;
a rating associated with a content catalog item; or
a review associated with a content catalog item.

4. The method of claim 1, wherein the second set of dimensions includes at least one of one or more dimensions representing:

whether the user watched a content catalog item;
whether the user purchased a content catalog item;
whether the user rented a content catalog item;
whether the user rated a content catalog item;
whether the user liked a content catalog item;
whether the user bookmarked a content catalog item;
whether the user reviewed a content catalog item; or
whether the user recommended a content catalog item.

5. The method of claim 1, wherein receiving the selection of the content catalog item or the received search query from the user includes:

receiving the search query; and generating a partial input vector based on one or more terms or parameters included in the search query, wherein selecting the one or more content catalog items from the content catalog using the stored self-organizing map includes:

mapping the partial input vector onto the stored self-organizing map to identify a set of points on the stored self-organizing map.

6. The method of claim 1, further comprising:

selecting a set of users;

generating user clusters for the selected set of users based on self-organizing maps associated with the selected set of users; and providing content catalog recommendations to particular ones of the selected set of users based on the generated user clusters.

7. The method of claim 6, wherein generating the user clusters for the selected set of users based on self-organizing maps associated with the selected set of users includes:

obtaining consumption information for the selected set of users relating to content catalog items in a content catalog;

generating related content results for catalog content items included in the obtained consumption information for the selected set of users using the self-organizing maps associated with the selected set of users;

selecting a distance metric for user similarity;

computing pairwise distances for the generated related content results for each pair of users in the selected set of users using the selected distance metric; and using a clustering method to generate the user clusters based on the computed pairwise distances.

8. A device comprising:

a processor configured to:

generate a self-organizing map for a user of a content catalog using categories associated with content catalog items in the content catalog and information that identifies whether the user has interacted with particular content catalog items in the content catalog, wherein, when generating the self-organizing map for the user of the content catalog, the processor is further configured to:
  generate a set of input vectors to train the self-organizing map, wherein each of the set of input vectors includes a first set of dimensions based on the categories associated with a particular catalog item and a second set of dimensions based on consumption information for the user with respect to the particular content catalog item;
assign the self-organizing map to the user by storing the self-organizing map in a user record for the user in a database, wherein the database includes different self-organizing maps for different users, and includes, for each particular user, a self-organizing map assigned to only the particular user and generated based on only the particular user's consumption information with respect to the content catalog;
generate a default self-organizing map using categories associated with content catalog items in the content catalog;
receive a selection of a content catalog item or a search query;
select one or more content catalog items from the content catalog using the stored self-organizing map for the user based on the received selection of the content catalog item or the received search query, when the selection of the content catalog item or the search query is received from the user,
select one or more content catalog items from the content catalog using the generated default self-organizing map based on the received selection of the content catalog item or the received search query, wherein the default self-organizing map is generated without using consumption information associated with users of the content catalog, when the selection of the content catalog item or the search query is received from another user that is not associated with a self-organizing map stored in the database; and
provide the selected one or more content catalog items from the content catalog to the user or the other user as a recommendation based on whether the selection of the content catalog item or the search query was received from the user or from the other user that is not associated with the self-organizing map stored in the database.

9. The device of claim 8, wherein, when selecting the one or more content catalog items from the content catalog using the stored self-organizing map, the processor is further configured to:
  generate an input vector for the received selection of the content catalog item or the search query;
  map the generated input vector onto stored the self-organizing map to identify one or more points on the self-organizing map for the user;
  select a set of points within a particular distance of the identified one or more points; and
  reverse map the selected set of points to one or more content catalog items in the content catalog.

10. The device of claim 8, wherein the first set of dimensions includes at least one of one or more dimensions representing:
  a type associated with a content catalog item;
  a genre associated with a content catalog item;
  people associated with a content catalog item;
  a language associated with a content catalog item;
  a description associated with a content catalog item;
  a rating associated with a content catalog item; or
  a review associated with a content catalog item.

11. The device of claim 8, wherein the second set of dimensions includes at least one of one or more dimensions representing:
  whether the user watched a content catalog item;
  whether the user purchased a content catalog item;
  whether the user rented a content catalog item;
  whether the user rated a content catalog item;
  whether the user liked a content catalog item;
  whether the user bookmarked a content catalog item;
  whether the user reviewed a content catalog item; or
  whether the user recommended a content catalog item.

12. The device of claim 8, wherein, when receiving the selection of the content catalog item or the received search query from the user, the processor is further configured to:
  receive the search query;
  generate a partial input vector based on one or more terms or parameters included in the search query; and
  wherein, when selecting the one or more content catalog items from the content catalog using the stored self-organizing map, the processor is further configured to:
  map the partial input vector onto the stored self-organizing map for the user to identify a set of points on the self-organizing map.

13. The device of claim 8, wherein the processor is configured to:
  select a set of users;
  generate user clusters for the selected set of users based on self-organizing maps associated with the selected set of users; and
  provide content catalog recommendations to particular ones of the selected set of users based on the generated user clusters.

14. The device of claim 13, wherein, when generating the user clusters for the selected set of users based on self-organizing maps associated with the selected set of users, the processor is further configured to:
  obtain consumption information for the selected set of users relating to content catalog items in a content catalog;
  generate related content results for catalog content items included in the obtained consumption information for the selected set of users using the self-organizing maps associated with the selected set of users;
  select a distance metric for user similarity;
  compute pairwise distances for the generated related content results for each pair of users in the selected set of users using the selected distance metric; and
  use a clustering method to generate the user clusters based on the computed pairwise distances.

15. A non-transitory computer-readable memory device storing instructions executable by a processor, the non-transitory computer-readable memory device comprising:
  one or more instructions to generate a self-organizing map for a user of a content catalog using categories associated with content catalog items in the content catalog and information that identifies whether the user has interacted with particular content catalog items in the content catalog, wherein the one or more instructions to generate the self-organizing map for the user of the content catalog further include:

one or more instructions to generate a set of input vectors to train the self-organizing map, wherein each of the set of input vectors includes a first set of dimensions based on the categories associated with a particular catalog item and a second set of dimensions based on consumption information for the user with respect to the particular content catalog item;

one or more instructions to assign the self-organizing map to the user by storing the self-organizing map in a user record for the user in a database, wherein the database includes different self-organizing maps for different users, and includes, for each particular user, a self-organizing map assigned to only the particular user and generated based on only the particular user's consumption information with respect to the content catalog;

one or more instructions to generate a default self-organizing map using categories associated with content catalog items in the content catalog;

one or more instructions to receive a selection of a content catalog item or a search query;

one or more instructions to select one or more content catalog items from the content catalog using the stored self-organizing map for the user based on the received selection of the content catalog item or the received search query, when the selection of the content catalog item or the search query is received from the user;

one or more instructions to select one or more content catalog items from the content catalog using the generated default self-organizing map based on the received selection of the content catalog item or the received search query, wherein the default self-organizing map is generated without using consumption information associated with users of the content catalog, when the selection of the content catalog item or the search query is received from another user that is not associated with a self-organizing map stored in the database; and one or more instructions to provide the selected one or more content catalog items from the content catalog to the user or the other user as a recommendation based on whether the selection of the content catalog item or the search query was received from the user or from the other user that is not associated with the self-organizing map stored in the database.

16. The non-transitory computer-readable memory device of claim 15, wherein the first set of dimensions includes at least one of one or more dimensions representing:

a type associated with a content catalog item;
a genre associated with a content catalog item;
people associated with a content catalog item;
a language associated with a content catalog item;
a description associated with a content catalog item;
a rating associated with a content catalog item; or
a review associated with a content catalog item.

17. The non-transitory computer-readable memory device of claim 15, wherein the second set of dimensions includes at least one of one or more dimensions representing:

whether the user watched a content catalog item;
whether the user purchased a content catalog item;
whether the user rented a content catalog item;
whether the user rated a content catalog item;
whether the user liked a content catalog item;
whether the user bookmarked a content catalog item;
whether the user reviewed a content catalog item; or
whether the user recommended a content catalog item.

* * * * *